(12) United States Patent
Schmitt

(10) Patent No.: US 6,173,220 B1
(45) Date of Patent: Jan. 9, 2001

(54) ATTITUDE DIRECTION INDICATOR WITH SUPPLEMENTAL INDICIA

(75) Inventor: John M. Schmitt, Glendale, AZ (US)

(73) Assignee: Honeywell International Inc., Morristown, NJ (US)

( * ) Notice: Under 35 U.S.C. 154(b), the term of this patent shall be extended for 0 days.

(21) Appl. No.: 09/416,577

(22) Filed: Oct. 12, 1999

(51) Int. Cl.[7] .................................... G02B 23/10

(52) U.S. Cl. .................. 701/4; 701/10; 701/14; 701/200; 340/945; 73/178 R; 345/7; 345/8; 345/9; 345/115; 345/121

(58) Field of Search .................. 701/4, 10, 14, 701/200; 345/115, 121, 7, 9, 8; 340/971, 972, 973, 974, 975, 979, 980, 982, 945; 73/178 R

(56) References Cited

U.S. PATENT DOCUMENTS 3,574,283 * 4/1971 Albers ........................... 340/980

* cited by examiner

Primary Examiner—William A. Cuchlinski, Jr.
Assistant Examiner—Yonel Beaulieu

(57) ABSTRACT

An attitude direction indicator (ADI) display includes a horizon line that divides an upper colored portion, which represents the sky, from a lower colored portion, which represents the Earth. The ADI display includes indicia incorporated into the upper and/or lower portions for enhancing the operator's situational awareness of the vehicle. The indicia may be configured as a texturing of the colored portions and/or as a gradient color scheme associated with the colored portions. The texturing scheme or gradient color scheme may be utilized to convey viewable information related to the vehicle's altitude or position relative to a reference such as a runway. Furthermore, the texturing scheme or the gradient color scheme may be utilized to render a directional marker that indicates a direction toward the horizon line.

26 Claims, 3 Drawing Sheets

ATTITUDE DIRECTION INDICATOR WITH SUPPLEMENTAL INDICIA

FIELD OF THE INVENTION

The present invention relates generally to vehicle instrumentation systems. More particularly, the present invention relates to an attitude direction indicator (ADI) for use with a vehicle such as an aircraft.

BACKGROUND OF THE INVENTION

The prior art is replete with various aircraft flight control instruments and displays. Such flight control displays, which may be of the panel mounted variety or of the head up display (HUD) variety, are commonly found in commercial, military, and civilian aircraft. One well known display instrument is an attitude direction indicator (ADI). An ADI typically indicates a reference point or line, e.g., a representative horizon line, relative to the position of the host aircraft. The aircraft may be represented by a fixed element of the ADI display; most ADIs depict the aircraft wings as one or more horizontal marks that are centered with respect to the display screen. The horizon line rendered on the ADI display may move up and down in response to changes in the pitch of the aircraft. Similarly, the horizon line may rotate in response to changes in the roll of the aircraft.

Many conventional ADIs include a blue colored portion above the horizon line (representing the sky) and a brown or tan colored portion below the horizon line (representing the Earth). This color scheme is employed to enable pilots to determine the attitude of the aircraft at any given moment. The color scheme is particularly helpful in situations where the pilot may be temporarily distracted or in situations where visibility is impaired. While an ADI having such a color scheme may be suitable in many situations, a pilot may have difficulty detecting small changes in tilt and roll based on slight movement of the horizon line and/or slight movement of the blue and brown colored segments.

In addition to the horizon line indication, conventional ADIs may also be configured to convey flight guidance information to the pilot. Such guidance information may be related to an approach target, e.g., a runway, or any reference point. The ADI may respond to an electronic landing system signal to display information that enables the pilot to fly the aircraft in an appropriate manner. Typically, the target information is rendered in the form of one or more alphanumeric "overlay" images that convey quantitative flight information to the pilot in conjunction with the other images discussed above. Unfortunately, such overlay images may be difficult to read and interpret under certain flight conditions, particularly when the pilot cannot concentrate his or her attention on the ADI.

ADIs and other related instrumentation may display alphanumeric or graphical information related to the direction of the aircraft relative to a specific reference point such as the horizon. However, the manner in which such information is typically displayed requires the pilot to scan the instrumentation panel (or HUD field), locate the displayed information, and interpret the information. Depending upon the current flight conditions, it may be difficult for a pilot to quickly and easily locate and digest such information. Consequently, the reaction time associated with adjusting the direction of the aircraft toward the reference point may be undesirably long.

Accordingly, it would be desirable to have an ADI having features that address the above shortcomings of the prior art.

BRIEF SUMMARY OF THE INVENTION

The present invention provides an improved ADI that exhibits enhanced image characteristics over conventional ADIs. The ADI is capable of conveying fine changes in pitch and roll to the pilot in a manner that is quick and easy to detect. In addition, the ADI may be configured to provide target approach information in an intuitive manner. Furthermore, the ADI may include an integral directional marker that is easy to detect and interpret by the pilot.

The above and other aspects of the present invention may be carried out in one form by an ADI for displaying the position of a vehicle. An illustrative ADI may include a display element configured to generate a viewable image associated with the position of the vehicle relative to at least one reference location, a dividing line image representative of a reference altitude, a first image portion defined by an area above the dividing line, a second image portion defined by an area below the dividing line, and indicia, incorporated into the first and/or second image portions. The indicia is configured to convey situational information associated with the position of the vehicle.

BRIEF DESCRIPTION OF THE DRAWINGS

A more complete understanding of the present invention may be obtained by referring to the detailed description and claims when considered in connection with the following illustrative Figures, wherein like reference numbers refer to similar elements throughout the Figures and:

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, display elements, and the like, which may carry out a variety of functions under the control of one or more microprocessors or other control devices. In addition, those skilled in the art will appreciate that the present invention may be practiced in conjunction with any number of vehicular instrumentation systems and that the aircraft flight system described herein is merely one exemplary application for the invention.

It should be appreciated that the particular implementations shown and described herein are illustrative of the invention and its best mode and are not intended to otherwise limit the scope of the present invention in any way. Indeed, for the sake of brevity, conventional techniques and components related to aircraft attitude detection, flight instrumentation, liquid crystal displays, HUDs, image rendering, landing and guidance methodologies, and other functional aspects of the systems (and components of the individual operating components of the systems) may not be described in detail herein. Furthermore, the ADI display images shown in the various figures are illustrative in nature and are not intended to limit the scope or applicability of the present invention in any way.

Figure 1:
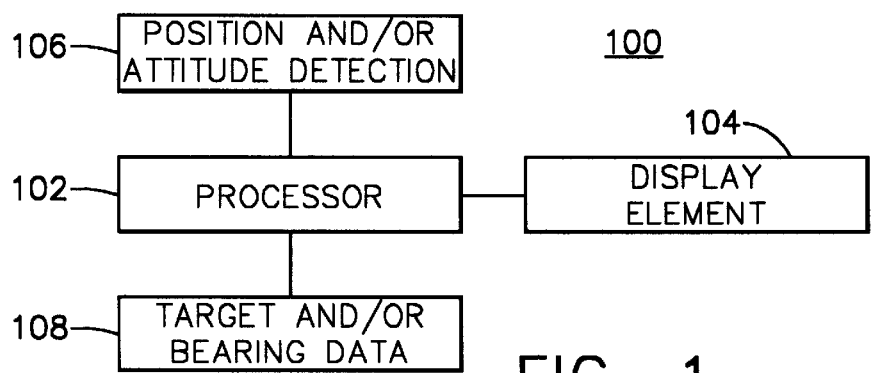
FIG. 1 is a schematic block diagram of an ADI system that may incorporate one or more features of the present invention.

Referring now to FIG. 1, an ADI system 100 may generally include a processor 102 and a display element 104. Processor 102 may include or cooperate with a position and/or attitude detection element 106 that is capable of determining the position of the vehicle relative to one or more reference locations, points, planes, or targets. In addition, processor 102 may be configured to receive, analyze, condition, and process target and/or bearing data 108 associated with the vehicle. ADI system 100 may be suitably configured for use in a commercial aircraft or any vehicle in which attitude and/or relative position information is to be displayed. The example system described herein relates to an aircraft ADI system.

Processor 102 may include any number of microprocessor elements, memory elements, power supplies, and other functional components as necessary to support the operation of ADI system 100. In this respect, processor 102 may include or cooperate with any number of software programs or instructions designed to carry out various methods, process tasks, calculations, control functions, and the generation of display signals and other data used by display element 104. In particular, processor 102 may be configured to generate position information associated with the position of the aircraft relative to at least one reference location. In accordance with another preferred feature of the invention, processor 102 is further configured to receive and process information associated with an approach target for the aircraft, e.g., a destination runway. Such processors and flight control computers are available from a number of manufacturers such as Honeywell, Inc.

Display element 104 may be based on a panel mounted display, a HUD projection, or any known technology. In addition to the enhanced features and indicia described in more detail below, display element 104 may include any number of conventional elements, e.g., visual indicators, alphanumeric text, lights, and the like. Display element 104 may receive a position signal (or signals) and generate a viewable image in response to the position signal. In this context, the position signal may be representative of position information that has been obtained and processed by processor 102.

Detection element 106 is configured to determine the position/attitude of the aircraft during flight. In a practical embodiment, detection element 106 and processor 102 may be integrally contained in a single housing. Detection element 106 may include or cooperate with any number of conventional components, e.g., gyroscopes, global positioning systems, and altimeters, to obtain position or attitude data that is processed by processor 102. The position/attitude data may be associated with one or more of the following parameters: the pitch of the aircraft relative to a reference such as the horizon; the roll of the aircraft relative to its longitudinal axis; the yaw angle of the aircraft relative to a specific heading; the latitude of the aircraft; the longitude of the aircraft; the altitude of the aircraft; and the like. Detection element 106 may utilize well known techniques and commercially available components that are suitably configured to generate the position data; the form and function of such conventional devices and systems will not be described in detail herein.

As mentioned above, processor 102 may be suitably configured to receive and process target and/or bearing data 108 related to an intended destination of the aircraft. In a practical commercial aircraft application, such data 108 may be associated with specific landing coordinates, a runway, or the like. This data 108 may be received by the aircraft via a conventional landing guidance system. As described in more detail below, processor 102 may process data 108 and generate appropriate signals to display element 104 such that display element 104 generates indicia representative of the approach target.

ADI system 100 is preferably configured such that display element 104 produces an enhanced rendering of the attitude and position information, as viewed by the pilot of the aircraft. A number of aspects of display element 104 (which are controlled by processor 102 in a practical embodiment) may contribute to the improved appearance of the ADI display, thus increasing the situational awareness of the pilot and/or flight crew. The image generation and display aspects of the present invention may leverage known techniques such that existing ADI systems can be modified in a straightforward manner to support the different features described herein. In a practical implementation, the concepts of the present invention may be realized in the form of revised display generation software or processing resident at processor 102.

Figure 2:
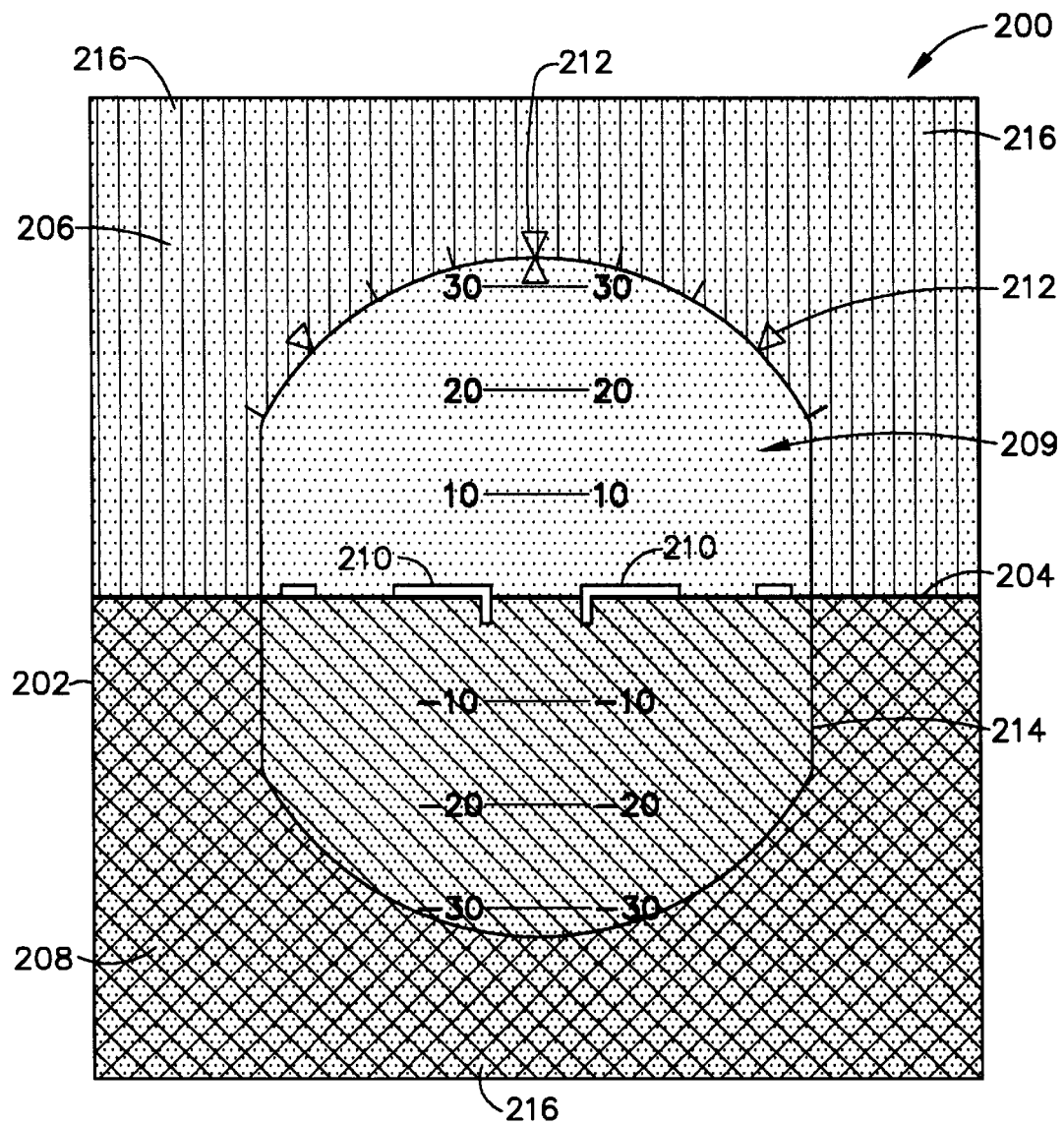
FIG. 2 is a schematic representation of an ADI display element configured in accordance with one embodiment of the present invention.

Referring now to FIG. 2, an exemplary ADI display element 200 may be used for display element 104. Display element 200 may include a main display area 202, which may be defined by any boundary that is appropriate for the particular application. Main display area 202 may be incorporated within a larger display element, and/or it may include any number of related or independent display elements, control elements, or instrumentation. The displayed features described herein may be suitably rendered on display element 200 in accordance with any number of known techniques.

Display element 200 includes a dividing line image that is preferably representative of a reference altitude of the aircraft. In a practical application, the dividing line image represents a virtual or imaginary horizon line 204. A first image portion 206, which may represent the sky, is defined by an area above horizon line 204. A second image portion 208, which may represent the ground or the Earth, is defined by an area below horizon line 204. Consequently, horizon line 204 may represent the junction between first image portion 206 and second image portion 208. In many conventional ADI displays, first image portion 206 is displayed as a first solid color (such as blue) and second image portion 208 is displayed as a second solid color (such as brown).

In accordance with conventional techniques, horizon line 204, first image portion 206, and second image portion 208 translate in response to changes in pitch of the aircraft. For example, FIG. 2 depicts a situation where the aircraft is experiencing approximately zero degrees of pitch. However, an increase/decrease in pitch would cause horizon line 204 to move upward/downward on display element 200. In addition, an "overlay" grid display 209 (depicted by the vertical numerical scale) may move up or down, relative to an aircraft marker 210, to indicate the approximate pitch angle. The movement of overlay display 209 may be independent of the movement of horizon line 204. Aircraft marker 210, which indicates the relative position of the aircraft and/or the aircraft wings, typically remains stationary relative to the instrument panel itself, i.e., aircraft marker 210 remains centered as shown in FIG. 2.

Horizon line 204, first image portion 206, and second image portion 208 may also rotate in response to changes in roll of the aircraft. For example, the situation displayed in FIG. 2 represents approximately zero degrees of roll. However, if the aircraft rolls in a clockwise direction, then horizon line 204, first image portion 206, second image portion 208, and overlay display 209 rotate in a counter-clockwise direction. Display element 200 may include suitable roll indicators 212 that provide the pilot with easy-to-read roll information. The manner in which ADI system 100 controls and displays changes in roll is well known to those skilled in the art.

Aircraft marker 210, overlay display 209, roll indicators 212, and/or other alphanumeric and graphical indicia, may be located within or proximate to a specific area of main display area 202. For example, as depicted in FIG. 2, display element 200 may include a smaller "window" area 214 defined within main display area 202. Window area 214 may be defined by a distinct border or it may be defined by using different shading, coloring, patterning, and/or other distinguishable display characteristics for those areas inside and outside of window areas 214. For example, first image portion 206 may employ a relatively dark shade of blue outside window area 214 (represented by the vertical hatching in FIG. 2) and a relatively light shade of blue inside window area 214. Similarly, second image portion 208 may employ a relatively dark shade of brown outside window area 214 (represented by the double cross hatching in FIG. 2) and a relatively light shade of brown inside window area 214 (represented by the single cross hatching in FIG. 2). The use of window areas 214 may be desirable to allow the pilot to easily focus his or her attention on the center of display element 200 during flight.

As described briefly above, prior art ADI displays that utilize solid coloring may not effectively convey slight changes in pitch and roll to the pilot. As an extreme example, it would be very difficult for a pilot to perceive any changes in roll or pitch if only a solid color is rendered on the display element. Similarly, even though the horizon line may rotate or translate in response to changes in roll or pitch, a pilot may not always be focusing his or her attention on the horizon line. Furthermore, a pilot may not be able to concentrate on the display element for more than a brief moment, thus making it difficult to perceive small deviations based on an overall impression of the display element features.

In contrast to such prior art ADIs, display element 200 preferably includes indicia, which is incorporated into, defined within, embedded into, or included in first image portion 206 and/or second image portion 208. The indicia is configured such that it conveys additional situational information associated with the position of the aircraft. In the preferred embodiment, such indicia need not be incorporated into an overlay display or displayed as an independent element of the ADI display. Accordingly, a pilot need not devote time searching for, recognizing, and interpreting additional display elements.

For example, as depicted in FIG. 2, the indicia may include a suitable texturing pattern 216 rendered within first image portion 206 and/or second image portion 208. Texturing pattern 216 is suitably configured to emulate a three dimensional surface roughness associated with the respective image portion. For example, texturing pattern 216 may be rendered such that it simulates the appearance of medium grit sandpaper. In this manner, texturing pattern 216 provides additional detail to first image portion 206 or second image portion 208 such that slight changes in pitch or roll can be detected by the pilot. It should be appreciated that FIG. 2 need not represent the true appearance of texturing pattern 216, and that an ADI system 100 may utilize any suitable texturing pattern, design pattern, or the like.

First image portion 206 may be textured in a different manner than second image portion 208, or the same texturing scheme may be used throughout display element 200. Moreover, as described in more detail below, different texturing patterns may be employed in a manner that conveys additional visible information to the pilot. For example, different texturing patterns may be used to highlight window area 214, to define an approach target, to convey positional information relative to horizon line 204, and the like.

Figure 3:
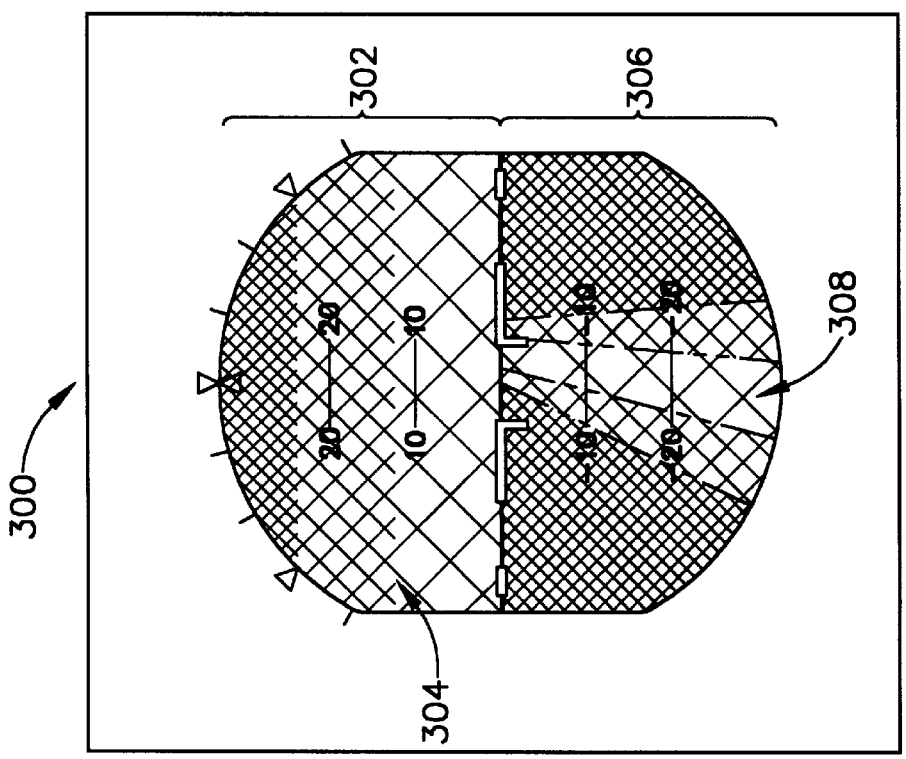
FIG. 3 is a schematic representation of an ADI display element configured in accordance with an alternate embodiment of the present invention.

FIG. 3 depicts an alternate display element 300 that may be utilized by ADI system 100. Display element 300 may be similar (in some respects) to display element 200. Accordingly, the description of common features and functionality will not be repeated in the context of display element 300. Like display element 200, display element 300 also utilizes additional indicia to enhance the pilot's situational awareness. Display element 300 utilizes at least one gradient color pattern to convey additional information to the pilot. For example, a first image portion 302 (which may represent the sky) may be rendered with a first gradient color pattern 304, while a second image portion 306 (which may represent the Earth) may be rendered with a second gradient color pattern 308.

With respect to first image portion 302, gradient color pattern 304 may be configured such that areas of first image portion 302 associated with relatively higher altitudes are shaded differently than areas of first image portion 302 associated with relatively lower altitudes. For example, in a preferred practical embodiment, areas of first image portion 302 associated with higher altitudes are darker colored than areas of first image portion 302 associated with lower altitudes. Accordingly, the particular colors in first image portion 302 may be a function of the pitch, roll, and/or position of the aircraft. In the context of an aircraft system, such a gradient color scheme simulates the appearance of the sky, i.e., darker blue above and lighter blue near the horizon. In FIG. 3, the finer cross hatching depicts relatively darker areas and the coarser cross hatching depicts relatively lighter areas.

With respect to second image portion 306, gradient color pattern 308 may be suitably configured such that areas of second image portion 306 having a first shade indicate an approach target (or a heading, a bearing, a position, etc.) for the aircraft, while areas of second image portion 306 having a second shade indicate deviation from the approach target. For example, in one practical embodiment, it may be desirable to depict a runway in second image portion 306. Accordingly, the runway may be represented by areas of second image portion 306 having a lighter brown color relative to other areas of second image portion 306. The gradient color pattern 308 may become progressively darker with increasing deviation from the approach target. Accordingly, the colors rendered in second image portion 306 may be a function of the pitch, roll, bearing, and/or position of the aircraft. Similarly, the color gradients associated with second image portion 306 may be a function of the proximity, alignment, or location of the aircraft relative to the approach target. In FIG. 3, the finer cross hatching in second image portion 306 represents darker brown portions and the coarser cross hatching in second image portion 306 represents lighter brown portions (corresponding to the runway).

Figure 4:
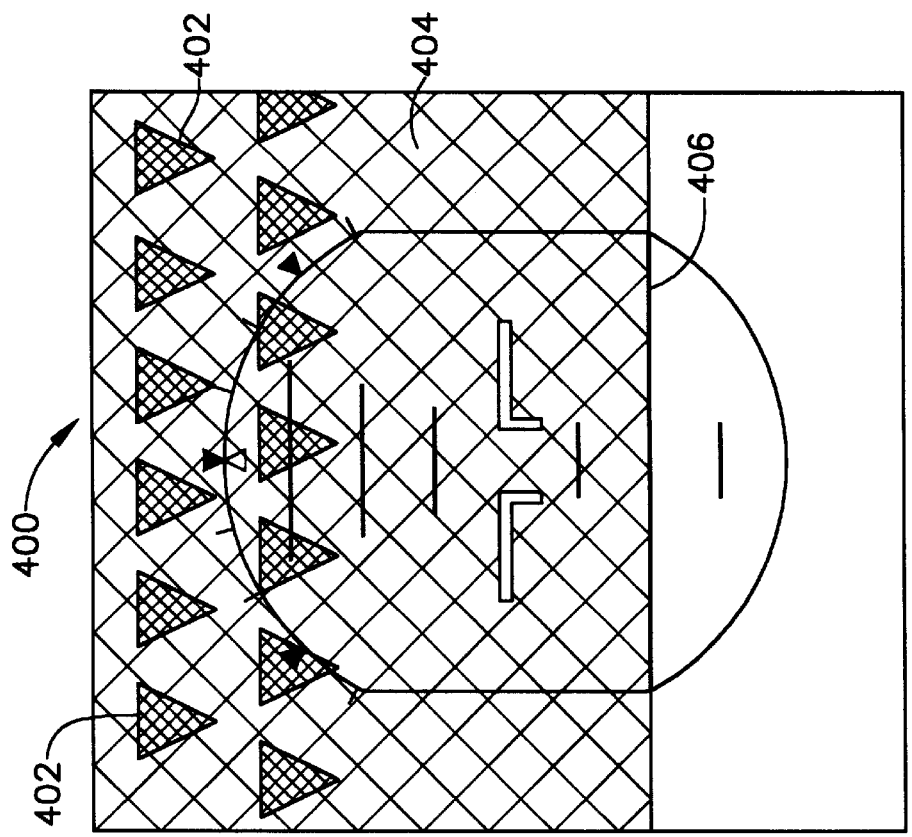
FIG. 4 is a schematic representation of an ADI display element configured in accordance with yet another embodiment of the present invention.

Referring now to FIG. 4, a display element 400 may be suitably generated with indicia related to one or more directional markers 402 for directing the aircraft toward a reference point. In a practical embodiment, directional markers 402 are rendered in a first image portion 404, which represents the sky, and directional markers 402 identify a direction toward a horizon line 406. Alternatively, directional markers 402 may identify a direction toward any suitable reference altitude.

In accordance with one preferred embodiment, directional markers 402 "point" toward horizon line 406 such that the pilot can quickly and easily determine the orientation of the aircraft and the pitch direction for leveling the aircraft. In FIG. 4, directional markers 402 are rendered in accordance with a color gradient scheme (as described above). For example, directional markers 402 may have a different shade or color than the surrounding areas of first image portion 404.

The features described above may be combined in any desired manner, and the characteristics of the different indicia may be predetermined or selectable via a suitable user interface. Moreover, a particular ADI display may use texturing or a color gradient scheme to render the various indicia described herein. For example, the altitude and approach target indicia shown in FIG. 3 may be equivalently rendered using a gradient texturing pattern scheme rather than a gradient color scheme. In addition, first image portion 302 may employ gradient colors and second image portion 306 may use gradient patterns. In addition, the example color gradient schemes described herein are not intended to limit the scope or application of the invention in any way. Furthermore, the texturing and color gradient schemes may be rendered at any resolution (e.g., from clearly defined segments to gradual blending of colors, shades, or textures).

Figure 5:
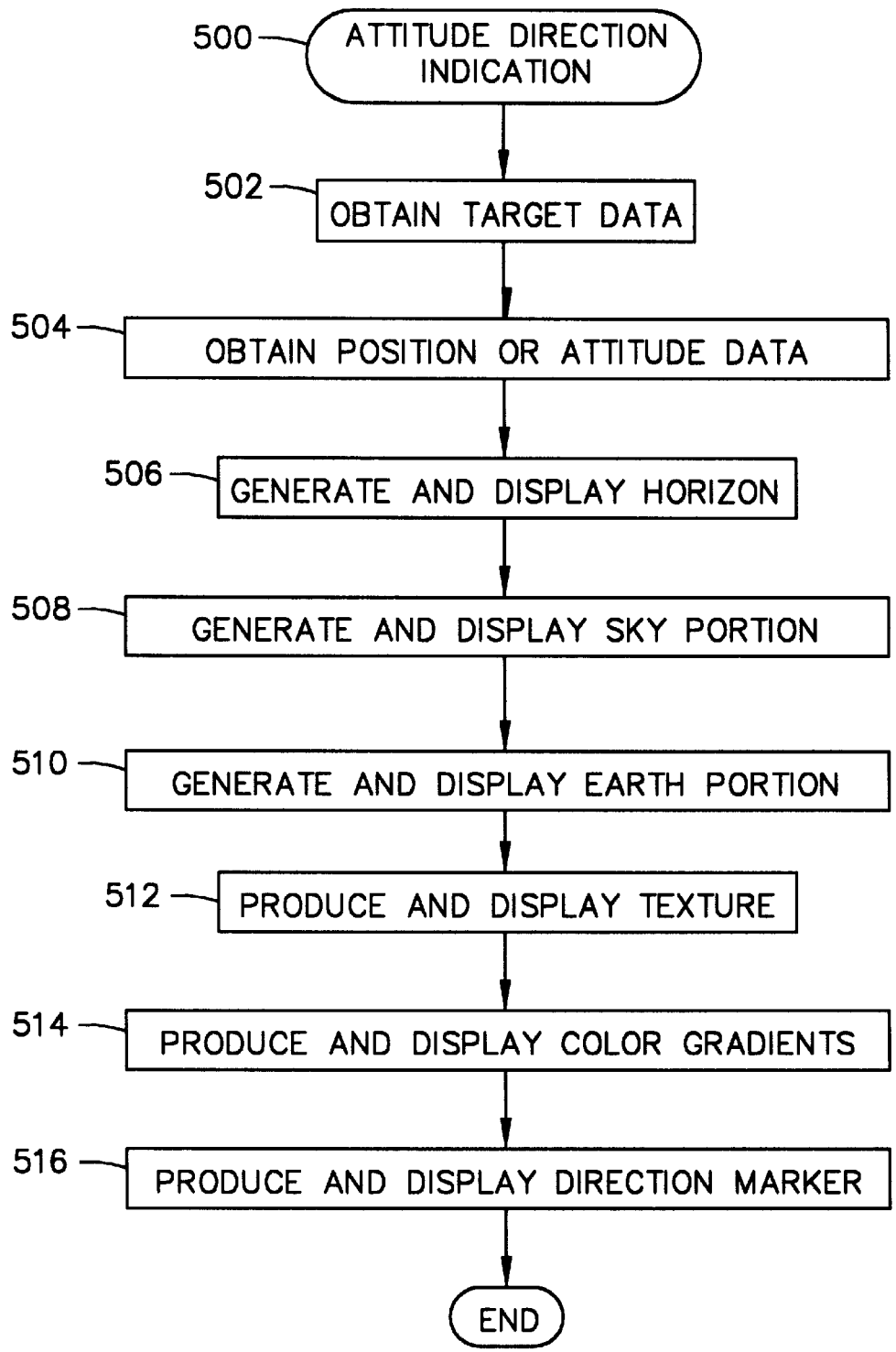
FIG. 5 is a flow diagram depicting an attitude direction indication process that may be performed by an ADI system configured in accordance with the present invention.

FIG. 5 is a flow diagram of an ADI display process 500 that may be performed by ADI system 100. Process 500 may obtain target or bearing data via the pilot, a suitable landing system, or a suitable positioning system (task 502). In addition, a task 504 obtains data associated with the position and/or attitude of the vehicle, relative to an appropriate reference. This data is utilized by ADI system 100 to generate and render the images that are displayed to the pilot.

A task 506 may be performed to generate and display a horizon line on the ADI display element. Similarly, the sky and Earth portions are suitably generated and rendered on the display element (tasks 508 and 510). As described above, these viewable elements may dynamically move and rotate in response to changes in the position/attitude of the aircraft. A task 512 may cause ADI system 100 to produce and display a suitable texturing pattern associated with the sky portion and/or the Earth portion, as described above. In addition, a task 514 may be performed to suitably produce and display color or shade gradients in the sky portion and/or the Earth portion. In a preferred embodiment, a task 516 is performed such that directional markers are produced and displayed in an integral manner with the sky portion. The characteristics of these features are described in detail above.

In a practical application, the various tasks associated with ADI display process 500 may be performed in a concurrent manner such that the ADI display is continuously and dynamically updated according to the current flight conditions. As mentioned above, process 500 may be realized by a suitable software application resident in processor 102 (see FIG. 1).

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. An attitude direction indicator (ADI) for displaying the position of a vehicle, said ADI comprising:

a display element configured to generate a viewable image associated with the position of said vehicle relative to at least one reference location;

a dividing line image representative of a reference altitude;

a first image portion generated on said viewable image, wherein said first image portion is defined by an area above said dividing line image;

a second image portion generated on said viewable image, wherein said first image portion is defined by an area below said dividing line image; and indicia, incorporated into at least one of said first and second image portions, configured to convey situational information associated with the position of said vehicle.

2. An ADI according to claim 1, wherein said dividing line image is representative of a horizon line.

3. An ADI according to claim 1, wherein said first image portion is representative of the sky.

4. An ADI according to claim 1, wherein:

said indicia is incorporated into said first image portion; and said indicia comprises a gradient color pattern configured such that areas of said first image portion associated with higher altitudes are shaded differently than areas of said first image portion associated with lower altitudes, wherein said higher and lower altitudes are relative to each other.

5. An ADI according to claim 4, wherein areas of said first image portion associated with higher altitudes are darker colored than areas of said first image portion associated with lower altitudes, wherein said higher and lower altitudes are relative to each other.

6. An ADI according to claim 1, wherein said second image portion is representative of the Earth.

7. An ADI according to claim 6, wherein:

said indicia is incorporated into said second image portion; and said indicia comprises a gradient color pattern configured such that areas of said second image portion having a first shade indicate an approach target for said vehicle and areas of said second image portion having a second shade indicate deviation from said approach target.

8. An ADI according to claim 7, wherein said approach target is represented by areas of said second image portion having a lighter color relative to areas of said second image portion that indicate deviation from said approach target.

9. An ADI according to claim 1, wherein said indicia comprises a texturing pattern configured to emulate a three dimensional surface roughness associated with said at least one of said first and second image portions.

10. An ADI according to claim 1, wherein said indicia comprises a gradient color pattern.

11. An ADI according to claim 1, wherein said indicia comprises a directional marker for directing said vehicle toward a reference point.

12. An ADI according to claim 11, wherein:

said directional marker is incorporated into said first image portion; and said directional marker identifies a direction toward said reference altitude.

13. An ADI according to claim 1, wherein said dividing line image, said first image portion, and said second image portion rotate in response to changes in roll of said vehicle.

14. An ADI according to claim 1, wherein said dividing line image, said first image portion, and said second image portion translate in response to changes in pitch of said vehicle.

15. An attitude direction indicator (ADI) system for displaying the position of a vehicle, said ADI system comprising:

a processor configured to generate position information associated with the position of said vehicle relative to at least one reference location;

a display element configured to receive at least one position signal representative of said position information and to generate a viewable image in response to said at least one position signal;

a dividing line image representative of a reference altitude, said dividing line image being rendered on said display element;

a first image portion defined by an area above said dividing line image, said first image portion being rendered on said display element;

a second image portion defined by an area below said dividing line image, said second image portion being rendered on said display element; and indicia, defined within at least one of said first and second image portions, configured to convey situational information associated with the position of said vehicle.

16. An ADI system according to claim 15, wherein:

said processor is further configured to receive and process information associated with an approach target for said vehicle; and said indicia is configured to indicate the proximity of said vehicle to said approach target.

17. An ADI system according to claim 16, wherein:

said second image portion is representative of the Earth;

said indicia is incorporated into said second image portion; and said indicia comprises a gradient color pattern configured such that areas of said second image portion having a first shade indicate said approach target and areas of said second image portion having a second shade indicate deviation from said approach target.

18. An ADI system according to claim 15, wherein:

said first image portion is representative of the sky;

said indicia is incorporated into said first image portion; and said indicia comprises a gradient color pattern configured such that areas of said first image portion associated with higher altitudes are shaded differently than areas of said first image portion associated with lower altitudes, wherein said higher and lower altitudes are relative to each other.

19. An ADI system according to claim 15, wherein said indicia comprises a texturing pattern configured to emulate a three dimensional surface roughness associated with said at least one of said first and second image portions.

20. An ADI system according to claim 15, wherein said indicia comprises a directional marker that identifies a direction toward said reference altitude.

21. A method for indicating the attitude of a vehicle with a display element configured to generate a viewable image associated with the position of said vehicle relative to at least one reference location, said method comprising the steps of:

(a) generating a dividing line image on said display element, said dividing line image representing a reference altitude;

(b) generating a first image portion on said display element, said first image portion being defined by an area above said dividing line image;

(c) generating a second image portion on said display element, said second image portion being defined by an area below said dividing line image; and (d) producing indicia, incorporated into at least one of said first and second image portions, configured to convey situational information associated with the position of said vehicle.

22. A method according to claim 21, wherein said step (d) produces a gradient color pattern configured such that areas of said first image portion associated with higher altitudes are shaded differently than areas of said first image portion associated with lower altitudes, wherein said higher and lower altitudes are relative to each other.

23. A method according to claim 21, wherein said step (d) produces a gradient color pattern configured such that areas of said second image portion having a first shade indicate an approach target for said vehicle and areas of said second image portion having a second shade indicate deviation from said approach target.

24. A method according to claim 21, wherein said step (d) produces a texturing pattern configured to emulate a three dimensional surface roughness associated with said at least one of said first and second image portions.

25. A method according to claim 21, wherein said step (d) produces a gradient color pattern.

26. A method according to claim 21, wherein said step (d) produces a directional marker that identifies a direction toward a reference point.

* * * * *